United States Patent
Krishnamurthy et al.

(10) Patent No.: US 9,569,225 B2
(45) Date of Patent: *Feb. 14, 2017

(54) MOBILE COMPUTING DEVICE RECONFIGURATION IN RESPONSE TO ENVIRONMENTAL FACTORS INCLUDING CONSUMPTION OF BATTERY POWER AT DIFFERENT RATES

(71) Applicant: International Business Machines Corporation, Armonk, NY (US)

(72) Inventors: Rajaram B. Krishnamurthy, Wappingers Falls, NY (US); Daniel A. Rogers, San Leandro, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/847,057

(22) Filed: Sep. 8, 2015

(65) Prior Publication Data

US 2016/0170772 A1   Jun. 16, 2016

Related U.S. Application Data

(63) Continuation of application No. 14/571,994, filed on Dec. 16, 2014.

(51) Int. Cl.
*G06F 13/00* (2006.01)
*G06F 9/44* (2006.01)
(Continued)

(52) U.S. Cl.
CPC ............ *G06F 9/4403* (2013.01); *G06F 1/263* (2013.01); *G06F 1/329* (2013.01); *G06F 1/3212* (2013.01);
(Continued)

(58) Field of Classification Search
CPC ............................ G06F 9/4403; G06F 1/3212
(Continued)

(56) References Cited

U.S. PATENT DOCUMENTS

| 5,452,277 A | * | 9/1995 | Bajorek | ............... G06F 1/3215 360/69 |
| 6,816,090 B2 | * | 11/2004 | Teckchandani | ....... B60R 25/102 340/539.13 |

(Continued)

OTHER PUBLICATIONS

"Method and Apparatus for an event based model for advanced profile management in mobile devices", An IP.com Prior Art Database Technical Disclosure, IP.com No. 000217999, pp. 1-5, IP.com Electronic Publication: May 15, 2012, <http://ip.com/IPCOM/000217999>.

(Continued)

*Primary Examiner* — Tammara Peyton
(74) *Attorney, Agent, or Firm* — Daniel R. Simek

(57) ABSTRACT

A method for dynamically modifying a mobile device. The method includes a computer processor identifying a plurality of profiles on a mobile device. The method further includes a computer processor receiving one or more inputs on the mobile device. The method further includes a computer processor identifying at least one trigger that corresponds to the received one or more inputs, wherein the at least one trigger is associated with at least one profile of the plurality of profiles. The method further includes a computer processor determining if the at least one trigger activates a response, based at least in part, on data included in the at least one profile that is associated with the at least one trigger. The method further includes a computer processor responding to the determination that the at least one trigger activates a response and applying the response to the mobile device.

6 Claims, 4 Drawing Sheets

(51) Int. Cl.
*G06F 1/32* (2006.01)
*G06F 1/26* (2006.01)
*G06F 9/445* (2006.01)

(52) U.S. Cl.
CPC .............. *G06F 1/3287* (2013.01); *G06F 8/71* (2013.01); *G06F 9/4405* (2013.01); *G06F 9/4451* (2013.01)

(58) Field of Classification Search
USPC ....................................... 710/62–74
See application file for complete search history.

(56) References Cited

U.S. PATENT DOCUMENTS

| | | | | |
|---|---|---|---|---|
| 7,518,500 | B2* | 4/2009 | Aninye | G07C 9/00111 340/506 |
| 7,599,484 | B2* | 10/2009 | Nattkemper | H04L 12/10 307/80 |
| 8,014,721 | B2 | 9/2011 | Johnson | |
| 8,351,916 | B2* | 1/2013 | Fan | H04M 3/02 455/404.1 |
| 8,630,234 | B2* | 1/2014 | Bjorsell | H04W 76/021 370/328 |
| 9,342,349 | B2* | 5/2016 | Nandyalam | G06F 9/46 |
| 2004/0165709 | A1* | 8/2004 | Pence | H04M 7/126 379/201.01 |
| 2007/0229350 | A1* | 10/2007 | Scalisi | G06F 21/35 342/350 |
| 2011/0208545 | A1* | 8/2011 | Kuester | G06Q 40/08 705/4 |
| 2012/0149350 | A1* | 6/2012 | Fan | H04M 3/02 455/418 |
| 2013/0023262 | A1 | 1/2013 | Zhang | |

OTHER PUBLICATIONS

U.S. Appl. No. 14/502,408, entitled "Trigger Based Portable Device Morphing", filed Sep. 30, 2014.
U.S. Appl. No. 14/138,728, entitled "Trigger Based Portable Device Morphing", filed Dec. 23, 2013.
List of IBM Patents or Patent Applications Treated as Related, Appendix P, Filed Herewith.
Krishnamurthy, et al., "Mobile Computing Device Reconfiguration in Response to Environmental Factors", U.S. Appl. No. 14/571,994, filed Dec. 16, 2014.

* cited by examiner

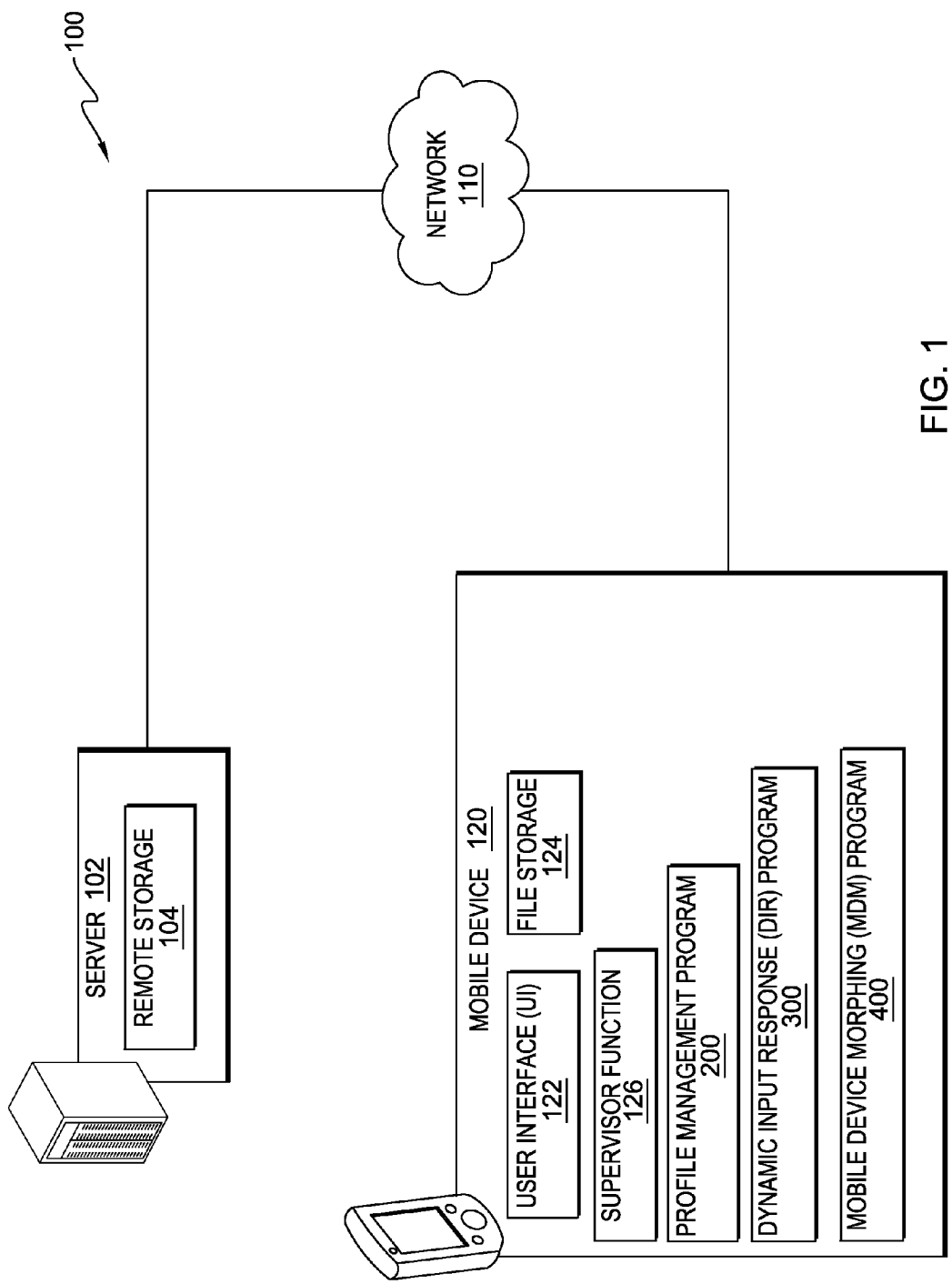

MOBILE COMPUTING DEVICE RECONFIGURATION IN RESPONSE TO ENVIRONMENTAL FACTORS INCLUDING CONSUMPTION OF BATTERY POWER AT DIFFERENT RATES

BACKGROUND OF THE INVENTION

The present invention relates generally to the field of mobile computing devices, and more particularly to a mobile computing device responding to internal and external stimuli.

Developments in cellular and computing technology have resulted in proliferation of smart mobile computing (e.g., handheld, electronic) devices, such as smartphones, tablet computers, advanced e-Readers, personal digital assistants (PDAs), etc. Further advances in miniaturization and materials have produced wearable devices with advanced capabilities, such as digital eyeglasses (e.g., smart glasses) and smart watches. Companies and businesses are developing e-commerce applications to take advantage of the opportunities presented by the growing number of highly-connected mobile users. While businesses strive to enhance the user experience of e-commerce applications, mobile computing devices are expanding beyond e-mail, photography, web browsing, multi-media presentations, and Bluetooth® communication. Enterprise systems allow a user to remotely access work-related functions, such as e-mail and databases on a mobile computing device. Mobile devices contribute to the growing network of social interactions and the connectedness of users. Advanced features incorporated into mobile devices include accelerometers, global positioning system (GPS) navigation, thermometers, altimeters, barometers, compasses, chronographs, near field communication (NFC), and radio-frequency identification (RFID). In addition, numerous miniaturized accessories transform some mobile devices into equipment with additional functionality that ranges from amusement (e.g., radio control toy console, fish finder) to mission-critical (e.g., smoke alarm, infrared hotspot detector, medical condition detector, portable microscope, radiation detector, etc.).

As mobile devices become ubiquitous, these devices are as common to some users as a wallet/purse or a set of keys. For other users, a mobile computing device is a veritable electronic "Swiss army knife," handling a plurality of functions and in some cases replacing the wallet and keys of a user. Coupled with Internet access, functions or programs that are not currently available on a mobile device can be quickly updated, acquired, and used.

SUMMARY

According to an aspect of the present invention, there is a method, computer program product, and/or system for dynamically modifying a mobile device. The method includes a computer processor identifying a plurality of profiles on a mobile device. The method further includes a computer processor receiving one or more inputs on the mobile device. The method further includes a computer processor identifying at least one trigger that corresponds to the received one or more inputs, wherein the at least one trigger is associated with at least one profile of the plurality of profiles. The method further includes a computer processor determining if the at least one trigger activates a response, based at least in part, on data included in the at least one profile that is associated with the at least one trigger. The method further includes a computer processor responding to the determination that the at least one trigger activates a response and applying the response to the mobile device.

BRIEF DESCRIPTION OF THE DRAWINGS

FIG. 1 illustrates a distributed data processing environment, in accordance with an embodiment of the present invention.

DETAILED DESCRIPTION

Figure 3:
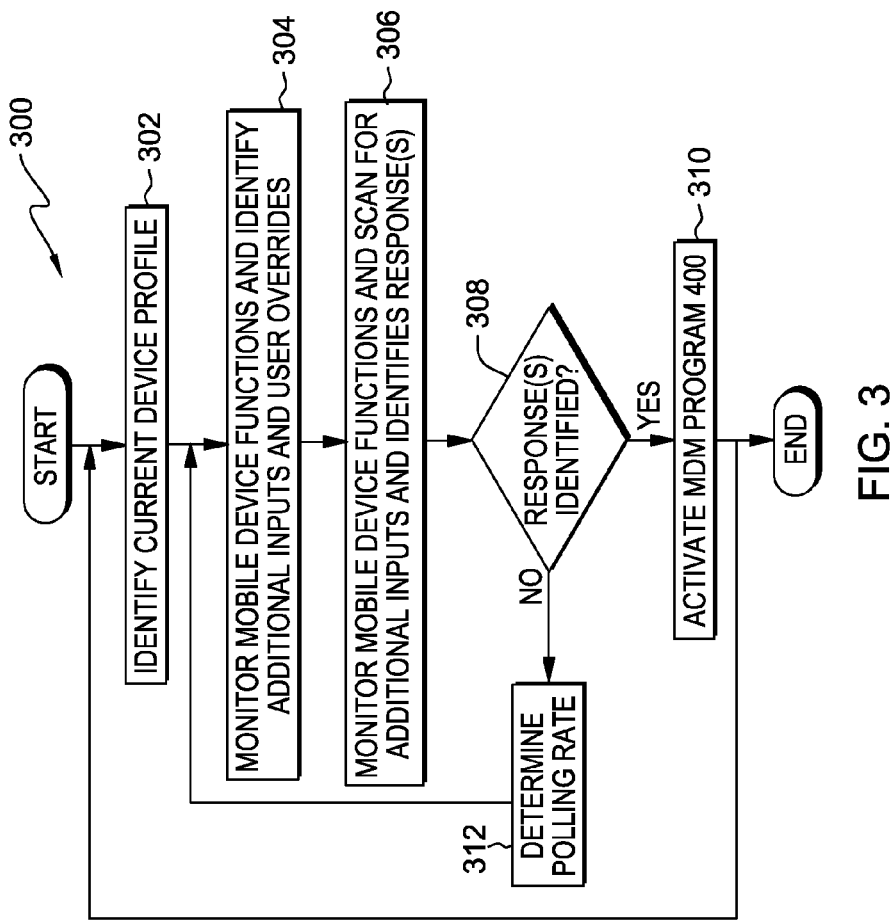
FIG. 3 depicts a flowchart of the steps of a dynamic input response program, in accordance with an embodiment of the present invention.

Embodiments of the current invention recognize that mobile computing devices (mobile devices) perform a diverse set of functions and provide a wide variety of behaviors for various purposes. Because a user may utilize the same mobile device for both work and personal use, the ability to change aspects and configurations of the mobile device can be desirable. However, a mobile device is unable to smoothly react and dynamically adapt (e.g., morph) to the match the current environment of a user and provide services for different requirements in a well-integrated fashion. In addition, a user may be unaware of how many applications are active in the background utilizing resources and which components of the mobile device, especially multi-core mobile devices, are consuming electrical power without providing a user with a tangible benefit.

The purpose of incorporating the "morphing" capabilities on a mobile device is seamlessly blending the appearance, capability, and behavior of the mobile device, transforming a utilitarian device into an integral part of the lifestyle of a user. An additional benefit of the morphing capability is the ability of the mobile device to optimize itself (e.g., improve energy management, automatically employ encryption or security protocols, and prepare for emergency situations). A mobile device implementing embodiments of the current invention dynamically morphs, based on knowledge of the surroundings of the mobile device, the state of the mobile device, a variety of stimuli (i.e., inputs) both internal and external, and information provided by one or more user profiles, which define various response scenarios based on the available inputs and stimuli.

Embodiments of the current invention herein described relate to incorporating dynamic morphing capabilities on a mobile device. The descriptions of the various embodiments of the present invention herein presented are for the purpose of illustrations but are not intended to be exhaustive or limited to the embodiments disclosed. Many modifications and variations will be apparent to those of ordinary skill in the art without departing from the scope and spirit of the invention. For example, embodiments of the current invention can be applied to alternate physical implementations of the presentation (e.g., GUI environment) and interaction methods. In one scenario, visual presentations can be combined with voice recognition or a motion sensing device (e.g., eye mapping) to create a "hands-free" implementation (e.g., smart-glasses).

Some embodiments of the current invention facilitate improved energy management, software updating, and the wholesale modification of the mobile device, which modifies the "stack" of the mobile device. The "stack" refers to various hardware and software configurations of a mobile device. The "stack" (e.g., system image) may include, but is not limited to, hardware (e.g., reconfigurable portion), the operating system, control functions, firmware, the software applications, and the service provider(s) associated with the mobile device. A stack "image" is a backup, replica, or clone of a stack configuration. A mobile device with sufficient persistent storage may store multiple stack images locally on the mobile device and avoid delays or connectivity issues storing and retrieving (e.g., downloading) stack images from remote storage.

One key group of triggers for some embodiments of the current invention are the battery life, battery charge-level, and battery charging status. Various profiles may utilize the battery charge-level to deactivate various features (i.e., functions) on the mobile device to improve energy efficiency or consume less battery power of the mobile device. Subsequently, as the battery charge-level is replenished by recharging the battery of the mobile, another trigger/response or another profile permits the activation of previously deactivated features. Whereas, another embodiment may utilize a profile that controls the remote/automatic updates to software apps on the mobile device utilizing the battery charge-level as an input (e.g., trigger). For example, a profile that swaps stacks may constrain the apps that may update to the apps active in the stack.

Monitoring the modifications to the stack subsequently triggers the loading of a different profile and the associated stack. Alternatively, monitoring the schedule of the user, the GPS position of the user, and the behaviors defined by the user, a profile can trigger the loading of a stack that prevents software updates from initiating based on the battery charge and the proximity of the user to a charging location (e.g., home, work). Since the stack includes configurable hardware, a profile that modifies the stack or a profile that invokes an app that can disable one or more cores (e.g., central processing unit) of a multi-core mobile device improves the energy efficiency of the device. Some mobile devices also allow the clock speed associated with a central processing unit (CPU) or cores to be controlled, incorporating an additional stack feature that effects energy efficiency and energy management.

In a different embodiment, multiple mobile devices incorporate the current invention providing the capability to swap or clone a mobile device. In one scenario, remotely storing the stack, profiles, personal data, and other information of different users enables one mobile device to morph into a second mobile device of another user. For example, in another scenario, a group of users with mobile devices may desire to quickly obtain the capabilities of the mobile device of another user, whether or not that user is present. For example, users joining in a search-and-rescue operation require the same capabilities (e.g., terrain mapping, emergency beacon tracking, local weather, etc.) that the professional rescue personal have on their mobile devices. In this example, the professional rescue personal provide the group of users, with mobile devices, access to a "search-and-rescue" profile.

The present invention will now be described in detail with reference to the Figures. FIG. 1 is a functional block diagram illustrating distributed data processing environment 100 in an embodiment, in accordance with the present invention. An embodiment of distributed data processing environment 100 includes server 102 and mobile device 120 interconnected over network 110. Many modifications to the depicted environment may be made by those skilled in the art without departing from the scope of the invention as recited by the claims.

Server 102 may be a laptop computer, a tablet computer, a netbook computer, a personal computer (PC), a desktop computer, a personal digital assistant (PDA), a smart phone, or any programmable computer system known in the art. In certain embodiments, server 102 represents a computer system utilizing clustered computers and components (e.g., database server computers, application server computers, etc.) that act as a single pool of seamless resources when accessed through network 110, as is common in data centers and with cloud-computing applications. In general, server 102 is representative of any programmable electronic device or combination of programmable electronic devices capable of executing machine readable program instructions and communicating with client computers, such as mobile device 120 via network 110. Server 102 may include components, as depicted and described in further detail with respect to FIG. 5, in accordance with embodiments of the present invention.

Server 102 includes remote storage 104 and various programs (not shown). In an embodiment, server 102 contains device "imaging" software to create and store duplicate versions of mobile device 120. In one scenario, an image is a complete backup of the software, operating system, user files, etc. of mobile device 120. In another scenario, the "images" are incremental backups.

In one embodiment, mobile device 120 and server 102 communicate through network 110. Network 110 can be, for example, a local area network (LAN), a telecommunications network, a wireless local area network (WLAN), a wide area network (WAN) such as the Internet, or any combination of the previous, and can include wired, wireless, or fiber optic connections. In general, network 110 can be any combination of connections and protocols that will support communications between mobile device 120 and server 102, in accordance with embodiments of the present invention. In another embodiment, network 110 operates locally via wired, wireless, or optical connections and can be any combination of connections and protocols (e.g., NFC, laser, infrared, etc.).

In one scenario, network 110 supports communication between mobile device 120 and a plurality of other devices. In another scenario, mobile device 120 acts as a "local hub" for network 110 permitting information to be exchanged between the one or more devices, mobile device 120, or a different mobile device. In one example, a device may be a powered electronic device that is not a computing device (e.g., wireless speakers). In this example, mobile device 120 may monitor the information exchanged between devices. The information may include content that acts as stimuli to trigger (e.g., activate) a response on mobile device 120. For example, a brown-out warning detected within the communication of local devices may trigger an energy conservation profile on mobile device 120. In addition, the morph to an energy conservation profile of mobile device 120 may subsequently transmit a warning to other devices controlled by the user. For example, a PC receiving the warning from mobile device 120 may institute back-up and save work protocols. In another example, a device may be a small, powered computing device, such a smartwatch or a fitness device. In yet another example, a device may be unpowered, such as an RFID tag embedded within or attached to an object. Network 110, connected to mobile device 120, may provide input (e.g., stimuli) from local sources utilized by an embodiment of the current invention to trigger one or more morphing responses.

Mobile device 120 may be a smart phone, a tablet computer, a netbook computer, a personal digital assistant (PDA), a wearable device (e.g., digital eyeglasses, smart glasses, smart watches), a laptop computer, or any programmable computer system operating utilizing wired or wireless network communications (e.g., WAN, laser, infra-red, etc.) known in the art. In general, mobile device 120 is representative of any programmable electronic device or combination of programmable electronic devices capable of executing machine readable program instructions and communicating with computers, such as server 102 via network 110. Mobile device 120 may include components, as depicted and described in further detail with respect to FIG. 5, in accordance with embodiments of the present invention.

Mobile device 120 includes user interface (UI) 122, file storage 124, supervisor function (supervisor) 126, profile management program 200, dynamic input response (DIR) program 300, and mobile device morphing (MDM) program 400. A user of mobile device 120 can interact with UI 122 via a singular device, such as a touch screen (e.g., display) that performs both input to a graphical user interface (GUI) and as an output device (e.g., a display) presenting a plurality of icons associated with software applications or images depicting the executing software application. Optionally, a software application can generate UI 122, operating within the GUI of mobile device 120. UI 122 accepts input from a plurality of input/output (I/O) devices (not shown) including, but not limited to, a tactile sensor interface (e.g., a touch screen, a touchpad) or a natural user interface (e.g., voice control unit, motion capture device, cyberglove, etc.). In addition to the audio and visual interactions that mobile device 120 may provide, a peripheral, such as a cyberglove, may provide haptic feedback to a user. An I/O device interfacing with UI 122 may be connected to mobile device 120 which may operate utilizing wired (e.g., USB port) or wireless network communications (e.g., infrared, NFC, etc.). For example, an I/O device may be a peripheral, such as a keyboard, a mouse, a trackball, and a click wheel that provide input from a user.

File storage 124 stores the user profiles that dictate the responses and morphing behavior to predefined inputs or stimuli. In one embodiment, a user profile is comprised of a plurality of inputs and associated responses. In another embodiment, each user profile is one set of inputs and associated responses.

Supervisor 126 is one or more high-level functions executing on mobile device 120. In one embodiment, supervisor 126 monitors the state of a plurality of features of mobile device 120. The state or change in state of a feature (e.g., camera, GPS, system clock, etc.) provide stimuli that initiates a morphing response. In another embodiment, supervisor 126 monitors feedback and results from one or more software programs (e.g., facial recognition, audio recognition, RFID information, an Internet search, biometric scan, etc.) to provide stimuli or additional inputs which may be needed to further qualify which one or more responses initiate.

Profile management program 200 receives input from a user to create or modify a user profile. A user identifies one or more inputs that trigger one or more responses and profile management program 200 associates the one or more triggers with one or more responses within a user profile and stores the information in a table or database within file storage 124. In some embodiments, a user profile may identify multiple logically triggered responses that may occur in parallel or in series. For example, an input occurring during a predetermined period of time may produce two or three results (e.g., a person's name, social media information, and professional bio/abstract). In another example, the initial input may trigger multiple responses, each additional input as it occurs further constrains subsequent responses until a singular response is identified.

Dynamic input response (DIR) program 300 identifies the current profile (e.g., installed software, backgrounds, active features and software, operating system, etc.) of mobile device 120. In one embodiment, the current system profile is stored on mobile device 120 within file storage 124. In another embodiment, the current profile of mobile device 120 or a stack image (e.g., backup, replica, clone) are stored on server 102 in remote storage 104. For example, if the operating system and applications on mobile device 120 are replaced with a different operating system and a different group of applications, as the result of a response, it may be easier to download the stack image of mobile device 120 rather than re-install and reconfigure the operating and software applications. In another embodiment, device profiles and associated micro-kernels are stored in protected memory (not shown) on mobile device 120. In one embodiment, DIR program 300 utilizes supervisor 126 to monitor device functions (e.g., states, values of the states, etc.). In some embodiments, DIR program 300 utilizes supervisor 126 or another software program to identify additional information associated with a response, which subsequently acts as an input that initiates another response. Based, at least in part, on the user profile and the identified response, DIR program 300 subsequently activates MDM program 400. In one scenario, DIR program 300 initiates a response based on the analysis of a static input (e.g., a picture, an identified portion of a picture, an image captured by a mobile device, a caller ID, a spoken name, etc.). In one scenario, DIR program 300 initiates a response based on the analysis of a time-varying input (e.g., a video, a conversation, variations in a mobile device state, GPS position, music, monitoring of external communication, external energy monitoring, etc.). For example, external energy sources may be thermal, visible light, acceleration variations (e.g., vibrations, impacts, movement of a user carrying a mobile device, etc.), and other types of electromagnetic energy. In some instances, the value of a state of mobile device 120 or the value of the analysis of app information may be a null value or an undefined value. For example, an undefined or null value may be associated with monitoring a device function that is deactivated.

Mobile device morphing (MDM) program 400 implements the one or more responses identified by DIR program 300. In one embodiment, MDM program 400 determines that the resources associated with the one or more responses identified by DIR program 300 exist on mobile device 120, and MDM program 400 reconfigures (e.g., morphs) mobile device 120 based on the identified one or more responses. In another embodiment, MDM program 400 determines that one or more resources dictated by the one or more responses do not exist (i.e., are missing) on mobile device 120. In response to a determination that one or more resources dictated by an identified response are not available on mobile device 120, MDM program 400 accesses network 110 to locate the one or more missing resources. If MDM program 400 cannot locate the one or more missing resources, MDM program 400 identifies an alternative response associated with the user profile and applies the alternative response to the reconfiguration of mobile device 120.

Figure 2:
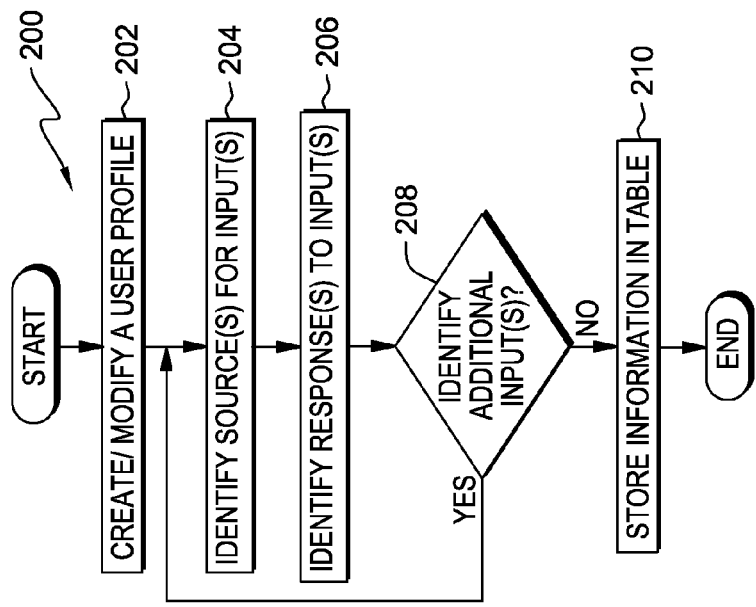
FIG. 2 depicts a flowchart of the steps of a profile management program, in accordance with an embodiment of the present invention.

FIG. 2 is a flowchart depicting operational steps for profile management program 200 executing on mobile device 120 within distributed data processing environment 100 of FIG. 1. In one scenario, profile management program 200 stores the user profiles, associated inputs, and responses in a table or database within file storage 124. In another scenario, profile management program 200 stores the user profiles, associated inputs, and responses in a table or database within remote storage 104 on server 102. In one embodiment, profile management program 200 obtains an indication of an input from a user. In one scenario, profile management program 200 receives a "hot-key" combination that the next input is used as the basis of a user profile. In another scenario, profile management program 200 receives the input via UI 122. For example, a user drags a picture from a folder within remote storage 104 on server 102 to the "input" box for a user profile on UI 122 executing on mobile device 120. Subsequently, profile management program 200 receives a further indication from the user as to which item (e.g., a Hawaiian print shirt) within the picture (e.g., a static input) is designated to trigger a response.

Profile management program 200 identifies one or more responses that a user associates with the input or trigger. For example, the response to a Hawaiian print shirt is defined as display background of mobile device 120 depicting a tropical scene, and the ringtones during the duration of the response change to tropical birdcalls. In another embodiment, profile management program 200 queries a user to determine if additional input(s) are associated with a user profile. For example, profile management program 200 utilizes another input of the system clock and the schedule of a user, which can inhibit the response to a Hawaiian print shirt during scheduled business hours. Other related files, such as ring-tone sounds and background images may reside within file storage 124 or another location (not shown) on mobile device 120. In another embodiment, the other related files are stored on server 102 in remote storage 104.

In step 202, in one embodiment, profile management program 200 provides a user UI 122 through which the user creates and identifies one or more user profiles. In another embodiment, profile management program 200 provides a user UI 122 through which the user modifies an existing profile.

In step 204, profile management program 200 identifies one or more sources (e.g., device states, actions, software applications, etc.) and one or more inputs (e.g., triggers, thresholds, events) respectively associated with one or more sources. In one embodiment, profile management program 200 receives information from a user via UI 122, which indicates one or more sources and the respectively associated one or more inputs that are associated with a user profile. In a scenario, profile management program 200 utilizes an image recognition application to identify a generic descriptor or tag for the image captured by the camera function of mobile device 120. For example, a picture of a monarch or a swallowtail are identified as types of butterflies. "Butterfly" is the generic descriptor or tag that triggers the response defined in a profile that has "butterfly" as an input and camera as a source. In another embodiment, profile management program 200 receives an indication, in real-time, from the user of a resource and an input (e.g., trigger). In one scenario, the user creates a profile in a step-by-step mode (e.g., creating a macro). In another scenario, the user is capturing an event for subsequent incorporation into a user profile. For example, a user is involved in a video conference (e.g., a time-varying input) via mobile device 120. The user identifies an individual that is speaking to profile management program 200 as a reference for a trigger. Subsequently, the user includes additional information that is associated with the identified speaker and indicates to profile management program 200 that the additional information is displayed in response to voice recognition software or facial recognition software identifying the speaker during subsequent interactions.

In a different embodiment, profile management program 200 determines that UI 122 is the source for one or more inputs. In one scenario, profile management program 200 configures UI 122 to act as a security measure. In one instance, UI 122 acts as a basic authentication interface. In another instance, profile management program 200 may have a "fail security check" profile that executes an incremental backup to remote storage 104 on server 102. An embodiment of the current invention may subsequently implement a "device wipe" morph on mobile device 120, removing virtually all apps and data. The "device wipe" morph retains an encrypted version of the current invention on mobile device 120 and a thin-client to permit the user restore full functionality and data to mobile device 120 in the future. In another scenario, profile management program 200 employs the input from UI 122 as a security function that enables two users to exchange functionality. In one instance, two users have stack images and data backed up to remote storage 104 on server 102. The mobile device of a second user is unavailable. For example, the mobile device of the second user may be out of power, lost, unavailable, or damaged. The user of mobile device 120 invokes a "user swap" morph where both users engage in authentication protocols. The second user retrieves the stack image and data from remote storage 104 on server 102 and effectively converts mobile device 120 into a clone of the mobile device of the second user.

In step 206, profile management program 200 identifies one or more responses to the one or more inputs. In one embodiment, the identified one or more responses automatically modify aspects of mobile device 120 that a user may accomplish manually. In one scenario, profile management program 200 executes in the background and records the actions of a user as the user manually reconfigures mobile device 120. Profile management program 200 identifies the steps and the outcome, and designates the steps and the outcome as the response associated with the creation or the modification of a profile. In another scenario, profile management program 200 executes in the foreground and UI 122 is active. For example, UI 122 may present a visual representation of mobile device 120. A user accesses the file directory of mobile device 120 and selects a file that is subsequently assigned to the background area of the visual (e.g., virtualized) representation of mobile device 120. Similarly, the user may select the phone function on the visual representation of mobile device 120, select ring-tone files on mobile device 120, and respectively associate the selected ring-tone files with the characteristics, IDs, or phone numbers in the phone directory of mobile device 120.

In decision step 208, profile management program 200 determines whether additional inputs are identified that are associated with the creation or modification of a profile. If profile management program 200 does not identify an indication that additional inputs are associated with the creation or modification of a profile (no branch, decision step 208), then profile management program 200 stores the created or modified profile (step 210). In one embodiment, profile management program 200 stores the created or modified profile in a table (e.g., list, database, etc.) on mobile device 120 in file storage 124. In another embodiment, profile management program 200 stores the created or modified profile in a table (e.g., list, database, etc.) on server 102 in remote storage 104.

If profile management program 200 does identify an indication that additional inputs are associated with the creation or modification of a profile (yes branch, decision step 208), then profile management program 200 loops to step 204. In one embodiment, profile management program 200 receives an indication from a user that the next source and input is utilized serially to further refine the identification of one or more responses. In another embodiment, profile management program 200 receives an indication from a user that the next source and input is utilized in parallel. In one scenario, a user profile provides a hierarchy of responses. In one instance, morphing responses are sequenced and may be cycled through without terminating a morphing response. In another instance, indications of the multiple morphs are virtualized; however, only the selected morphing response occurs. If another response is selected, the initial morphing response is terminated. In another scenario, a user may create a hybrid morphing response that tiles or segments the viewing area of mobile device 120 where each segment displays a different response.

FIG. 3 is a flowchart depicting operational steps for dynamic input response (DIR) program 300, executing on mobile device 120 within distributed data processing environment 100 of FIG. 1. DIR program 300 identifies the current profile (e.g., configuration) of mobile device 120 and responds to user activity, to changes in one or more device states of mobile device 120, to external inputs (e.g., stimuli) from the environment, and to internal inputs (e.g., network activity, in-coming phone call, etc.). DIR program 300 monitors a plurality of user defined profiles. In one embodiment, DIR program 300 utilizes supervisor 126 or another software program to monitor the various inputs and initiate responses based on information contained within user profiles. In addition, DIR program 300 utilizes supervisor 126 to monitor mobile device 120 for additional inputs that may be linked to the initial one or more responses. Based on one or more inputs or responses, DIR program 300 identifies one or more responses associated with a user profile that subsequently triggers a "morphing" behavior on mobile device 120. In another embodiment, if DIR program 300 does not identify sufficient information and inputs to identify a morphing response, then DIR program 300 loops. During each loop, DIR program 300 polls the various sources of inputs. The rate of looping and polling may be adjusted to improve energy efficiency.

In step 302, DIR program 300 identifies the current profile and configuration of mobile device 120. In one embodiment, DIR program 300 determines the original or default profile and configuration for mobile device 120 (e.g., the profile that is currently operating on mobile device 120). In one scenario, DIR program 300 stores the default profile or stack in file storage 124. In another scenario, DIR program 300 clones or creates a backup image for some or all of the stack, operating system, software, and data on mobile device 120 and stores the clone or backup image on remote storage 104. A backup image facilitates returning mobile device 120 to a known profile once one or more reconfigurations (e.g., morphs) add or remove the operating system or software programs on mobile device 120.

In step 304, DIR program 300 monitors one or more mobile device functions and identifies whether events or stimuli associated with the one or more mobile device functions triggers the monitoring of additional mobile device functions. Additionally, a user may override the monitoring or the reaction to the monitored device functions. In one embodiment, DIR program 300 utilizes supervisor 126 to monitor various states (e.g., battery charge-level) and functions of mobile device 120. In another embodiment, the one or more mobile device functions on mobile device 120 are not limited to the GPS, the accelerometer, the camera, the NFC function, or the keypad. Functional elements of mobile device 120 can include installed software or data transmitted or received by the installed software. In one scenario, DIR program 300 detects the camera of mobile device 120 acquiring a picture. In addition, the user provides another input, for example, a vocal command, which activates an image recognition program. In one instance, DIR program 300 may react to the information provided by the image recognition program. In another instance, DIR program 300 delays reacting to the information provided by the image recognition program until an additional input, defined in a user profile, is identified. In some embodiments, a user predefines overrides. For example, an override may be based on times and dates to prevent monitoring activity or prevent monitoring activity from initiating responses.

In step 306, DIR program 300 monitors one or more functions of mobile device 120 and scans for additional inputs. In one embodiment, DIR program 300 utilizes the additional inputs to refine which of the plurality of user profiles matches the inputs received by mobile device 120. Based on the additional inputs, DIR program 300 identifies a user profile that contains one or more responses that are associated with the monitoring data and the additional inputs. In one scenario, DIR program 300 derives the additional inputs from user actions. In another scenario, the additional inputs are based on real-time analysis of information that is received or transmitted by mobile device 120. In one instance, DIR program 300 analyzes the information that occurs in the environment surrounding mobile device 120. For example, DIR program 300 utilizes image processing and image recognition of pictures or video captured via the camera on mobile device 120. In another instance, DIR program 300 applies voice recognition analysis to a conversation received by mobile device 120 via network 110.

In another embodiment, additional inputs may be controlled by logical operations either to act as a filter or to deactivate some functions or apps as part of an energy management strategy. In a scenario, as the battery charge-level (e.g., trigger, input) of mobile device 120 attains a threshold level, DIR program 300 identifies another response. In one example, DIR program 300 determines that a first threshold level is attained, and the associated response deactivates one or more functions of mobile device 120. In another example, DIR program 300 determines that a second battery charge-level threshold level is attained by mobile device 120, and the associated response loads a different stack, which further reduces energy consumption by deactivating one or more cores, reducing the CPU clock speed, and constraining the activation or operation of one or more features or apps.

In decision step 308, DIR program 300 determines whether a response, which subsequently results in a morphing behavior, is identified. If DIR program 300 identifies a response that results in a morphing behavior (yes branch, decision step 308), then DIR program 300 subsequently activates MDM program 400.

In step 310, DIR program 300 activates MDM program 400. Additionally, DIR program 300 loops to step 302. In one embodiment, DIR program 300 loops to step 302 to identify changes in inputs or monitors for additional inputs occurring. In one scenario, DIR program 300 loops in real-time. In another scenario, DIR program 300 delays the loop. For example, DIR program 300 is operating in an energy conservation mode. In a different scenario, DIR program 300 pauses the loop until supervisor 126 detects a user input, for example, a hot-key combination. In another embodiment, MDM program 400 reacts to the initial one or more responses identified by DIR program 300. Subsequent to MDM program 400 initiating a morphing behavior, based on one or more identified responses, modifications to the profile of mobile device 120 may affect future activities of DIR program 300. The modifications (e.g., morphs) applied to mobile device 120 may affect the software and functions available for monitoring and scanning for additional inputs or changes to inputs.

Referring to decision step 308, if DIR program 300 does not identify a response which subsequently results in a morphing behavior (no branch, decision step 308), then DIR program 300 loops scanning (e.g., polling) mobile device 120 for one or more inputs. In one embodiment, DIR program 300 polls device states of mobile device 120, such as GPS information, battery charge, charging status, temperature, signal strength, etc. In another embodiment, DIR program 300 polls one or more software applications for information to utilize as one or more inputs.

In step 312, DIR program 300 determines the polling rate to acquire input (e.g., stimuli) information from monitoring mobile device 120 when at least one response has not been identified. In one embodiment, DIR program 300 monitors various device states (e.g., battery charge, charging condition) of mobile device 120 to determine a polling rate. In one scenario, DIR program 300 varies the polling rate based on the battery charge of mobile device 120. In one instance, mobile device 120 is connected to a charger, permitting the polling rate to be enhanced. In another instance, as the battery charge of mobile device 120 decreases, DIR program 300 may reduce the rate of polling to reduce energy consumption. In another scenario, DIR program 300 reduces or suspends polling based on the detection of an external input or a change on mobile device 120. For example, mobile device 120 is transported into a secured environment (e.g., workplace, communication suppression area, etc.). In another example, the user activates encryption on mobile device 120.

Figure 4:
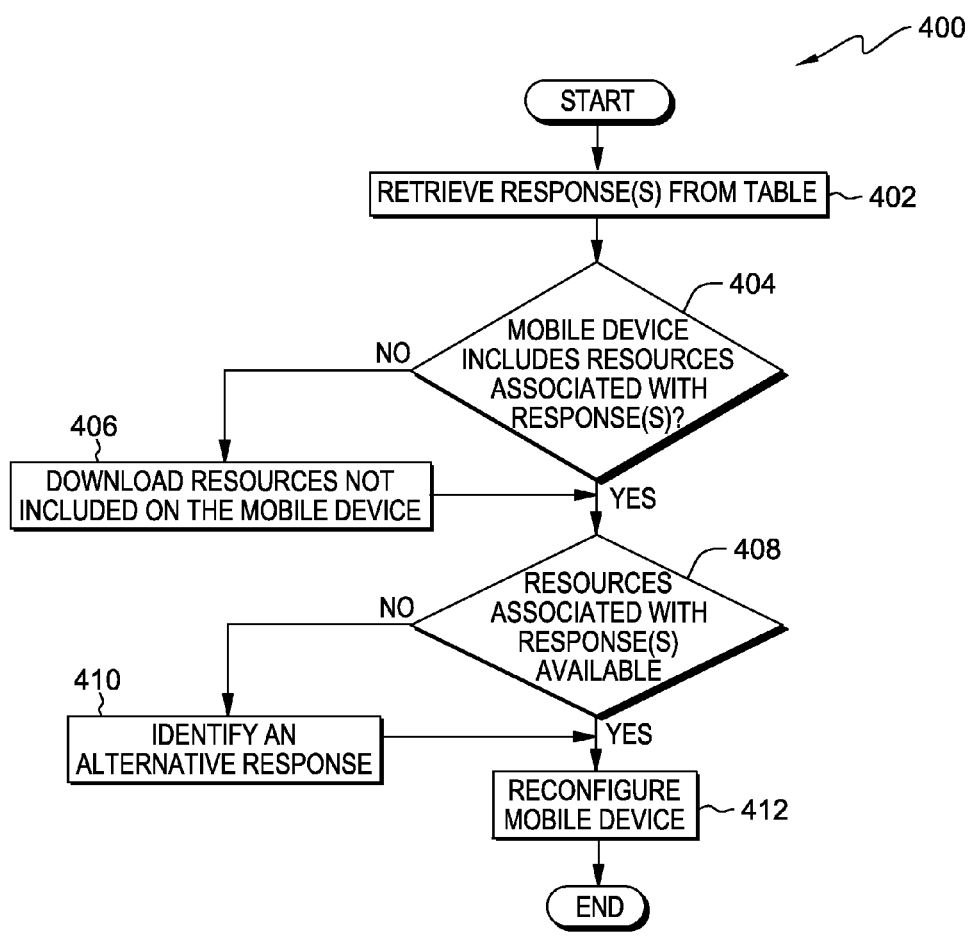
FIG. 4 depicts a flowchart of the steps of a mobile device morphing program, in accordance with an embodiment of the present invention.

FIG. 4 is a flowchart depicting operational steps for mobile device morphing (MDM) program 400 executing on mobile device 120 within distributed data processing environment 100 of FIG. 1. Mobile device morphing (MDM) program 400 applies user-defined responses, based at least in part, on one or more inputs that are defined to trigger one or more responses. MDM program 400 implements the one or more responses identified by DIR program 300. In one embodiment, MDM program 400 determines whether mobile device 120 includes the resources associated with the one or more responses (identified by DIR program 300), and MDM program 400 reconfigures (e.g., morphs) mobile device 120 based on the identified one or more responses. In another embodiment, MDM program 400 determines that one or more resources dictated by the one or more responses are not included within mobile device 120, and MDM program 400 downloads the one or more dictated (e.g., missing) resources via network 110. MDM program 400 subsequently morphs mobile device 120 when the downloaded resources are available.

The types of responses (e.g., morphs) range from adjusting to background and ring-tones of the mobile device to matching the style of the wardrobe of a user to reconfiguring a majority (e.g., stack, the operating system, the installed applications, the telecommunication service provider, the GUI layout, etc.) of the mobile device 120. In some embodiments, if MDM program 400 cannot download the one or more of the dictated resources, then MDM program 400 applies an alternative response. In one scenario, MDM program 400 reconfigures mobile device 120 based on the alternative response. In another scenario, MDM program 400 does not identify an alternative response and may respond with a null response. For example, the null response may leave the configuration of mobile device 120 unchanged. In another example, the null response reverts mobile device 120 to a default configuration or profile.

In step 402, MDM program 400 retrieves the one or more responses identified by DIR program 300 (in step 306) based on one or more inputs from a table. In one embodiment, a table comprised of a plurality of user profiles, inputs (e.g., trigger, thresholds, etc.), and responses resides within file storage 124 on mobile device 120. In another embodiment, a table comprised of a plurality of user profiles, inputs (e.g., trigger, thresholds, etc.), and responses resides within remote storage 104 on server 102.

In decision step 404, MDM program 400 determines whether the resources associated with the one or more responses identified by DIR program 300 are included (e.g., exists) on mobile device 120. In response to a determination that the resources associated with the one or more responses identified by DIR program 300 are not included (e.g., are missing) on mobile device 120 (no branch, decision step 404), then MDM program 400 locates the resources missing from mobile device 120 that are dictated by the one or more identified responses. In an embodiment, MDM program 400 subsequently downloads the missing resources. In one scenario, files, including image or backup files, are stored on server 102 in remote storage 104. In another scenario, MDM program 400 determines the location of one or more resources, dictated by the one or more responses identified by DIR program 300, at least in part, on the information associated with a user profile, and one or more systems accessible via network 110 (e.g., the Internet, website of a software supplier, etc.). In a different embodiment, information associated with a response is located within file storage 124 on mobile device 120.

In step 406, MDM program 400 downloads one or more resources that are not included on mobile device 120, as dictated by the one or more responses identified by DIR program 300. In one embodiment, MDM program 400 downloads the one or more resources not available on mobile device 120. In one instance, the one or more missing resources is located on server 102. In another instance, the missing one or more resources is located on the Internet (accessible via network 110). In another embodiment, MDM program 400 determines that one or more resources dictated by the one or more responses identified by DIR program 300 cannot be downloaded. In one scenario, mobile device 120 experiences a loss of network connectivity. In one instance, MDM program 400 contacts the user via UI 122 to determine if the user delays the identified response until the missing resource is downloaded. In another instance, MDM program 400 receives an indication from the user to proceed without the missing resource. In another scenario, mobile device 120 does not experience a network connectivity problem, and MDM program 400 does not find at least one of the missing resources dictated by the one or more responses identified by DIR program 300. In a different embodiment, MDM program 400 recovers or retrieves the missing resources from file storage 124 or another persistent storage location (not shown) on mobile device 120.

Referring to decision step 404, in response to determining that the resources associated with the one or more responses identified by DIR program 300 are included on mobile device 120 (yes branch, decision step 408), MDM program 400 continues to decision step 408.

In decision step 408, MDM program 400 determines whether resources associated with the one or more responses are available. In response to a determination that the resources associated with the one or more responses dictated by DIR program 300 are available (yes branch, decision step 408), MDM program 400 reconfigures (e.g., morphs) mobile device 120. In one embodiment, the resources reside within mobile device 120. In a different embodiment, one or more resources are accessed via network 110. In one scenario, the one or more resources are stored in volatile memory on mobile device 120 for the duration of the one or more responses identified by DIR program 300. In one instance, MDM program 400 signals the user, via UI 122, for a determination whether the resources in volatile memory are stored for subsequent usage, for example on remote storage 104. In another instance, MDM program 400 releases the resource in volatile memory if a new response (e.g., reconfiguration) initiates that does not require the resource in volatile memory. In another scenario, one or more resources are dynamically accessed via network 110. For example, the dynamically accessed resource may be a streaming video or other multi-media form.

In step 412, MDM program 400 reconfigures (e.g., morphs) mobile device 120. In one embodiment, MDM program 400 reconfigures mobile device 120 based on the one or more responses identified by DIR program 300. In another embodiment, the reconfiguration of mobile device 120 includes a stack change. In one scenario, the current stack or stack image is uploaded to remote storage 104 on server 102 prior to reconfiguring mobile device 120. In another scenario, mobile device 120 has sufficient persistent storage to permit the secure storage of the current stack or the stack image on mobile device 120. In a different embodiment, mobile device 120 locates accessible storage space on a device that exists locally (e.g., a portion of the intranet or Internet of "things") to upload the current stack, stack image, or some apps and data. In a scenario, various stacks are stored on mobile device 120 to maintain the configuration of a user; however, different stacks are instituted as responses to energy management profiles. A further embodiment provides for mobile device 120 off-loading some processing requirements to another locally accessible device to conserve energy.

Referring to decision step 408, in response to determining that one or more resources associated with the one or more responses identified by DIR program 300 are not available (no branch, decision step 408), MDM program 400 identifies an alternative response for mobile device 120 in step 410.

In step 410, MDM program 400 identifies an alternative response (e.g., configuration, profile, etc.) from a table or database within file storage 124 on mobile device 120. In some embodiments, the table or database containing the response is located in remote storage 104 on server 102. In one embodiment, the alternate response may be a null response and mobile device 120 maintains the current device configuration. In another embodiment, MDM program 400 determines which aspects of the one or more responses identified by DIR program 300 can initiate without the availability of one or more resources. In a different embodiment, MDM program 400 may identify the null response as initiating profile management program 200, such that a user can identify an alternate response for the resources currently available.

In step 412, MDM program 400 reconfigures mobile device 120 based on the alternative response identified. In one embodiment, MDM program 400 identifies the null response. In one scenario, mobile device 120 is set to a default profile and configuration, and MDM program 400 does not initiate a change to the configuration or profile of mobile device 120. In another scenario, mobile device 120 is in a non-default configuration or profile. For example, MDM program 400 had previously initiated a reconfiguration (e.g., activated a morph) based on one set of input values corresponded to a response for which the one or more resources was available. Subsequent inputs trigger DIR program 300 to identify a different one or more responses respectively causing MDM program 400 to determine another set of resources, one of which one or more are unavailable, associated with the different one or more responses. In one instance, MDM program 400 reverts mobile device 120 to the default configuration and profile. In another instance, MDM program 400 selects a different alternate response. For example, MDM program 400 may maintain the previous profile for mobile device 120.

Figure 5:
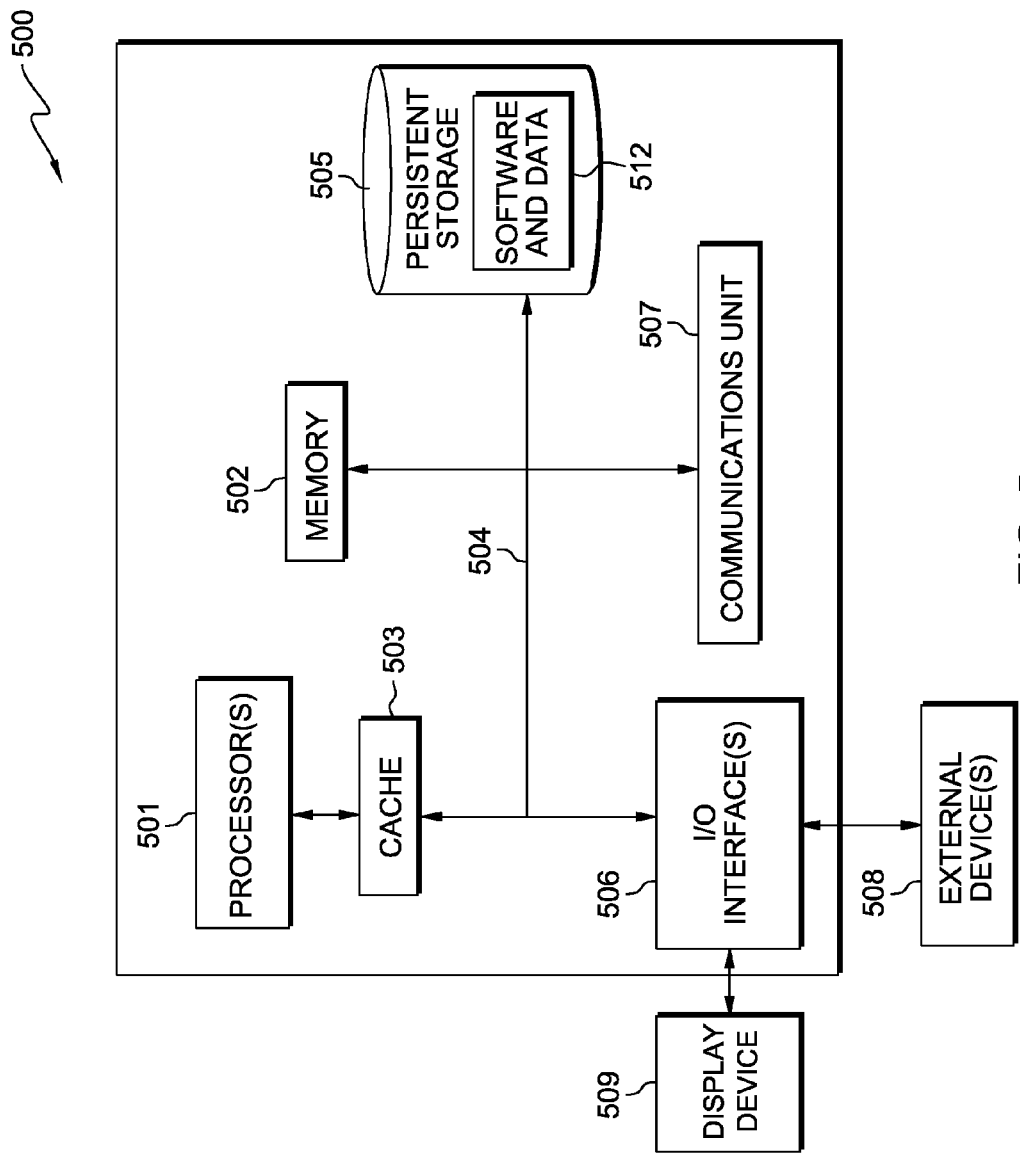
FIG. 5 is a block diagram of components of a computer, in accordance with an embodiment of the present invention.

FIG. 5 depicts computer system 500, which is representative of server 102 and mobile device 120. Computer system 500 is an example of a system that includes software and data 512. Computer system 500 includes processor(s) 501, cache 503, memory 502, persistent storage 505, communications unit 507, input/output (I/O) interface(s) 506, and communication fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processors 501 via cache 503 and one or more memories of memory 502. With respect to server 102, software and data 512 includes remote storage 104, and other programs and data (not shown). With respect to mobile device 120, software and data 512 includes user interface (UI) 122, graphical user interface (GUI) not shown, file storage 124, supervisor function 126, profile management program 200, dynamic input response (DIR) program 300, and mobile device morphing (MDM) program 400.

Communications unit 507, in these examples, provides for communications with other data processing systems or devices, including resources of server 102 and mobile device 120. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display device 509.

Display device 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for dynamically modifying a mobile device, the method comprising:
    identifying, by one or more computer processors, a plurality of profiles on a mobile device;
    receiving, by one or more computer processors, one or more inputs on the mobile device;
    identifying, by one or more computer processors, at least one trigger that corresponds to the received one or more inputs, wherein the at least one trigger is associated with at least one profile of the plurality of profiles;
    determining, by one or more computer processors, if the at least one trigger activates a response, based at least in part, on data included in the at least one profile that is associated with the at least one trigger;
        wherein the identified at least one trigger includes a first trigger, the first trigger is associated with a battery power level of the mobile device indicating a first threshold;
    in response to determining that the first trigger associated with the battery power level of the mobile device attains the first threshold, activating, by one or more computer processors, a first response in an energy management profile within the plurality of profiles;
    determining, by one or more computer processors, that the first trigger associated with the battery power level of the mobile device attains a second threshold; and
    in response to determining that the first trigger associated with the battery power level of the mobile device attains the second threshold, activating, by one or more computer processors, a second response in the energy manage profile, wherein the second response includes replacing, by one or more computer processors, a first hardware and software configuration of the mobile device with a second hardware and software configuration associated with the mobile device, and wherein the second hardware and software configuration consumes battery power at a different rate than the first hardware and software configuration on the mobile device; and
    in response to determining that the at least one trigger activates a response, applying, by one or more computer processors, the response to the mobile device.

2. The method of claim 1, wherein the first response of an energy management profile includes at least one of deactivating one or more features of the mobile device and modifying one or more features of the mobile device.

3. The method of claim 1, wherein the first response of an energy management profile includes at least one of deactivating one or more software application on the mobile device and modifying one or more software applications on the mobile device.

4. The method of claim 1, further comprising:
    receiving, by one or more computer processors, a second input, wherein the second input is associated with a mobile device profile;
    identifying, by one or more computer processors, a third hardware and software configuration within a plurality of hardware and software configurations accessible by the mobile device, which is associated with the received second input and a second user;
    downloading, by one or more computer processors, the third hardware and software configuration from the plurality of hardware and software configurations, wherein the plurality of hardware and software configurations includes hardware and software configurations of the user, the second user, and other mobile device users; and
    applying, by one or more computer processors, the downloaded third hardware and software configuration to the mobile device.

5. The method of claim 1, further comprising:
    identifying, by one or more computer processors, a group of profiles within the plurality of profiles on the mobile device, wherein the members of the group of profiles contain the identified at least one trigger and one or more additional triggers;

determining, by one or more computer processors, a second profile, wherein the second profile is the member of the group of profiles which contains the at least one trigger, and the one or more additional triggers;

identifying, by one or more computer processors, a second response associated with the second profile, wherein the second response is based, at least in part, on the at least one trigger and the one or more additional triggers; and activating, by one or more computer processors, the second response on the mobile device.

6. The method of claim 1, wherein the identified at least one trigger is based, at least in part, on analyzing visual input to the mobile device, wherein the visual input includes video inputs or picture inputs.

* * * * *